April 16, 1968
S. R. CROCKETT
3,377,952
PROBE EJECTING ROCKET MOTOR
Filed Oct. 19, 1966
2 Sheets-Sheet 1
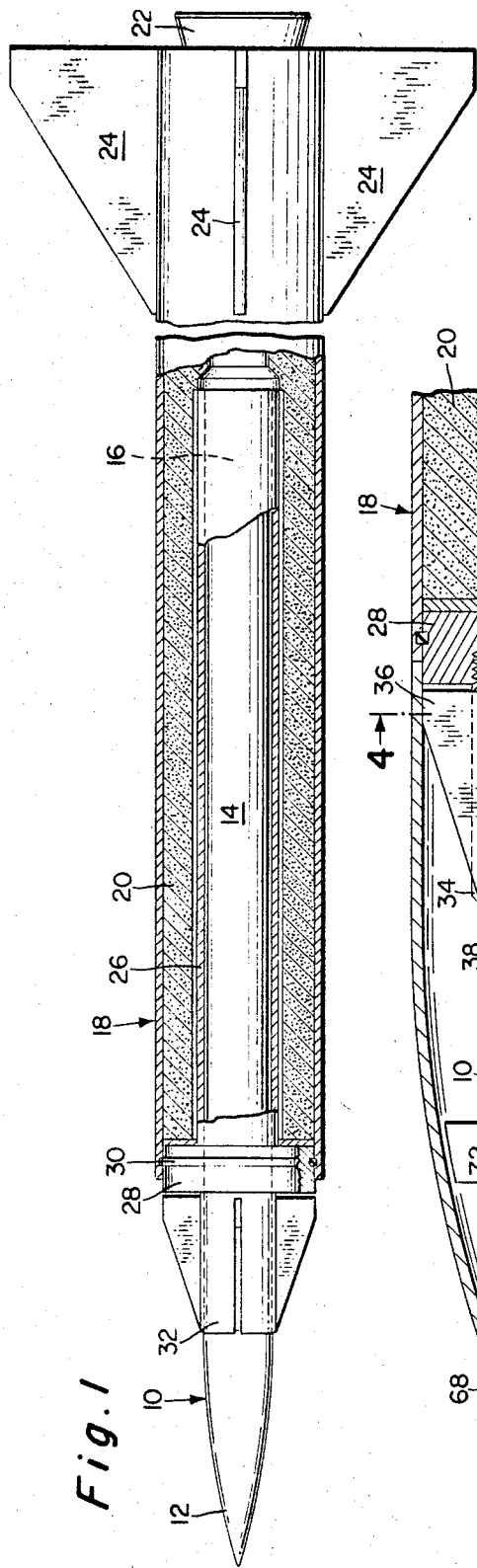
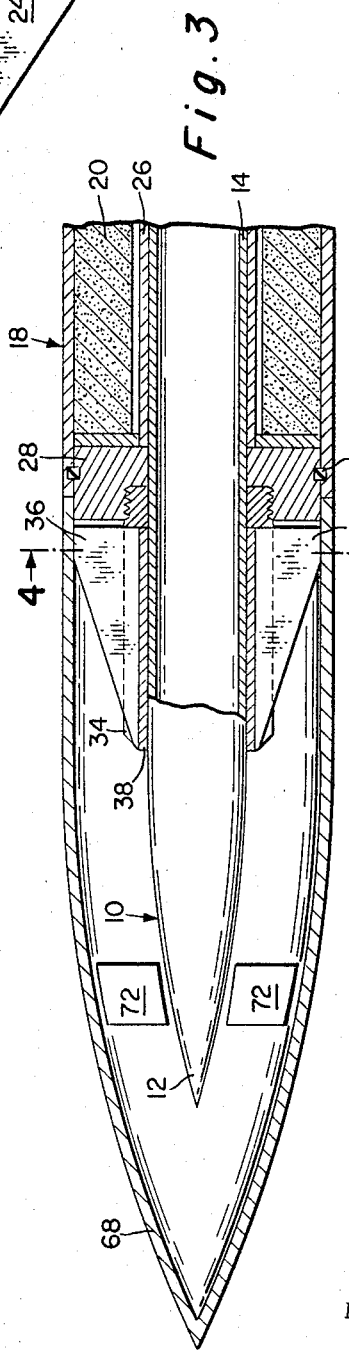
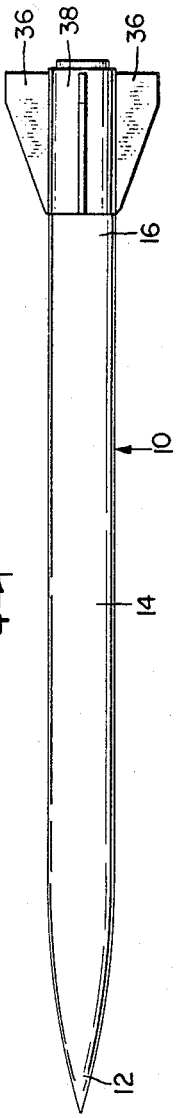
INVENTOR.
SYDNEY R. CROCKETT
BY
*Q. Baxter Warner*
ATTORNEY April 16, 1968 S. R. CROCKETT 3,377,952
PROBE EJECTING ROCKET MOTOR
Filed Oct. 19, 1966 2 Sheets-Sheet 2

United States Patent Office 3,377,952
Patented Apr. 16, 1968

3,377,952
PROBE EJECTING ROCKET MOTOR
Sydney R. Crockett, 1926 Almanor St.,
Oxnard, Calif. 93030
Filed Oct. 19, 1966, Ser. No. 588,668
13 Claims. (Cl. 102—49.4)

ABSTRACT OF THE DISCLOSURE

A probe or projectile is carried aloft by a rocket vehicle and is expelled from the vehicle by the rocket tail-off gases. The projectile expulsion is initiated by relative movement between the projectile and rocket as a result of higher air drag on the latter. Such movement opens a valve, venting rocket tail-off pressure to the base of the projectile to expel the latter. A stabilizing fin assembly is picked up by the tail end of the projectile as it emerges from the rocket.

---

The invention described herein may be manufactured and used by or for the Government of the United States of America for governmental purposes without the payment of any royalties thereon or therefor.

This invention relates to probes such as meteorological probes and more particularly to means for delivering such probes to greater altitudes.

Meteorological probes, sometimes referred to as sounding rockets, have been in increasing use since 1946 and are a primary means for developing knowledge of the upper atmosphere. The former method of placing a probe at altitudes of up to 200,000 feet has been to use a booster motor provided at its forward end with an interfitting connection to engage the base of a probe. The matching tolerances for such interconnecting connection must be very close so as to minimize any malalignment when probe and motor are united. Former probe-booster assemblies required a long launcher tube having a number of spirally arranged rails within its bore; this launcher tube was expensive and difficult to manufacture.

Another defect with such former devices is that when the booster motor burns out and the probe separates from the motor (due to drag differential only), the booster motor becomes unstable due to grain burn-out and may deflect the after end of the probe laterally during the separation or pull-away of the interfitting connection. This disturbs the true flight of the probe, and makes radar acquisition difficult if not impossible.

It is an object of this invention to provide a meteorological probe assembly having a considerably lower length to diameter ratio and thus greater stability than existing devices.

Another object of the present invention is to provide a simple and efficient means for assembling a booster motor and probe into a compact unit and launching the unit.

A further object of the present invention is to provide improved interconnecting means for a booster motor and a meteorological probe which facilitates separation of the parts.

A still further object of this invention is to provide means for utilizing booster tail-off gases to augment probe ejection.

According to the present invention, the foregoing objects are attained by nesting a major portion of the meteorological probe within the booster vehicle used to carry the probe to the upper atmosphere. A considerable reduction in the overall length of the probe and booster is thus attained providing greatly increased stability. The probe is ejected at cessation of forward acceleration of booster motor by admitting tail off booster motor exhaust gases into a chamber at the rear of the probe, such gases effecting separation at a point determined by expiration of the booster motor. In addition, the exhaust gases impart a further velocity to the probe to increase the altitude it may reach.

Other objects and many of the attendant advantages of this invention will be readily appreciated as the same becomes better understood by reference to the following detailed description when considered in connection with the accompanying drawings in which like numerals designate like parts throughout and wherein:

FIG. 1 is a side elevational view with a portion broken away of an assembled booster motor and probe with nose cone removed;

FIG. 2 is a side elevational view of a probe after separation from the booster motor;

FIG. 3 is an enlarged longitudinal sectional view partially in elevation of the forward end of the device of FIG. 1 with nose cone in place;

Figure 4:
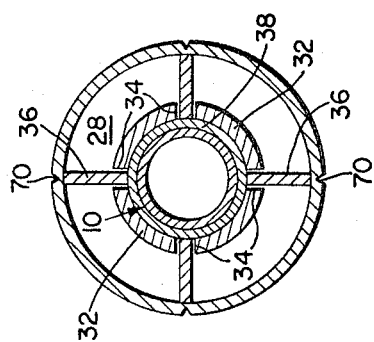
FIG. 4 is a cross sectional view taken along a line substantially corresponding to line 4—4 of FIG. 3.
Figure 5:
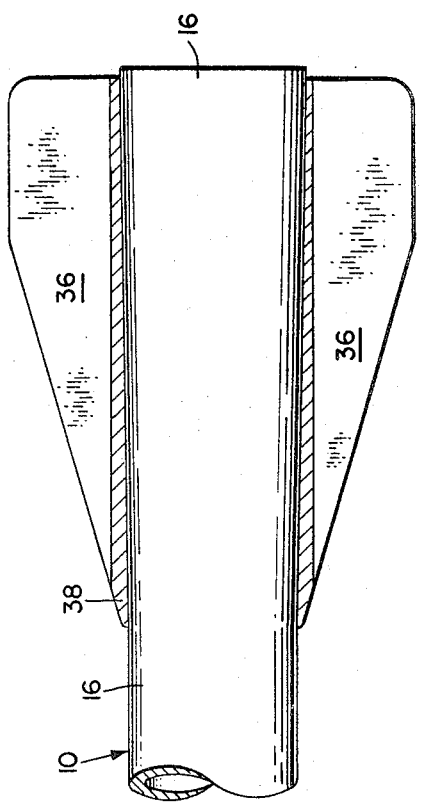
FIG. 5 is an enlarged longitudinal sectional view of the probe fin assembly of FIG. 1 in place on the after end of a probe.

Referring now to the drawings there is illustrated in FIG. 1 a probe and booster motor assembly wherein a major portion of the body of probe or projectile 10 is shown received within the elongate axial bore of a booster motor 18. As shown in FIG. 2 this probe has a nose portion 12, a central payload section 14, and a tail portion 16. The booster motor may be powered by a suitable solid propellant 20 extending substantially the length of the booster motor and the booster has an exhaust nozzle 22 through which the burning propellant gases are emitted. Stabilizing fins 24 surround the after end of the booster motor. The inner surface of the propellant along the axial bore is spaced a short distance away from a tubular canister 26 which latter receives the major length of the probe 10 and is retained in place by a forward propellant grain end plate 28 which in turn is locked into the booster motor shell by any suitable means such as square retaining ring 30. The exterior of the canister may be provided with a heat resistant or ablative material coating.

Figure 6:
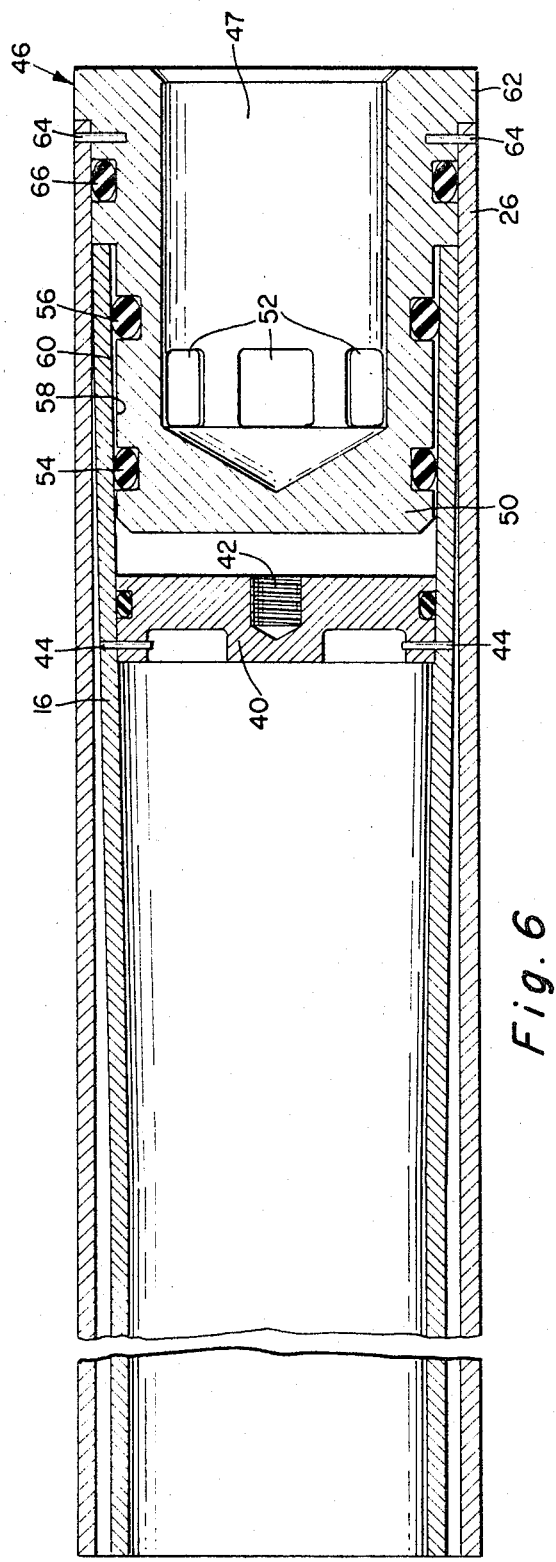
FIG. 6 is a greatly enlarged detail view of the propellant gas control means used to assist separation of the probe from the booster motor at booster burn out.

On the opposite side of the end plate 28 is provided a collar 32 which contains four radially disposed slots 34 (FIGS. 3 and 4) to accommodate four radially extending probe fins 36. As shown these probe fins are mounted upon a short tubular probe fin supporting sleeve 38 which is sufficiently larger than the exterior dimension of the probe so that upon separation of the probe from the rocket motor the probe easily slides through the sleeve until the after end or tail portion 16 of the probe reaches the sleeve. This after end is slightly tapered to flare aft so as to be larger ta the tail end (see FIG. 6) and the interior of sleeve 38 is similarly tapered so that as the enlarged after end reaches the sleeve it picks up the probe fin carrying sleeve which then serves to provide fin stabilization for the tail of the probe during the remainder of its flight. If desired the fins may be slightly slanted to impart spin stabilization to the probe. As shown in FIG. 6 a probe rear wall 40 is located within the after end 16 of the probe and has a threaded central socket 42 to permit it to be positioned in place by a positioning rod (not shown) until shear pins 44 can be inserted to anchor it in place. Disposed partially within section 16 at its base or aft end is a gas flow control plug or valve means 46 having an outer diameter sufficiently less than the inner diameter of the adjacent portion of the canister to permit the valve means to be inserted into the rear end of the probe.

Gas flow control plug 46 includes an internally hollow cylindrical body having an end opening 47 and an outer diameter which is slightly less than the inner diameter of probe tail portion 16. Plug 46 has a closed forward end wall 50. It is provided with a series of radial openings or ports 52 for permitting the escape of booster motor exhaust gases under selected conditions. O-rings 54 and 56 are disposed forward and aft, respectively, of ports 52 and form gas tight seals with the adjoining interior surface of tail section 16. Within at least this portion of probe tail 16 the periphery 58 of valve means 46 is spaced an appreciable distance from the adjacent inner surface 60 of probe tail 16 thereby permitting exhaust gases to reach the space bounded by surfaces 58 and 60 and O-rings 54 and 56 during a part of the launch phase.

It will be noted that the plug 46 has outer ledge or rim 62 which abuts the open rear end of canister 26 when the plug is inserted therein and anchor pins 64 held the plug in place. An O-ring 66 seals the joint so formed.

The tubular fin supporting sleeve 38 (FIGS. 2 and 4) is normally positioned at the forward end of the booster motor and is supported about the probe body with fins 36 extending through slots 34 formed in collar 32.

In assembly a timing or sensing mechanism is installed in probe or projectile nose 12 and the payload is inserted into the open rear end of the probe tail portion 16. Thereafter probe rear wall 40 is inserted and secured in place by shear pins 44. Plug 46 is then inserted into the rear end of canister 26 and anchor pins 64 are then inserted thus securing the plug to the canister. The canister tube is then inserted into the propellant grain 20 and square wire 30 inserted to lock the end plate 28 in place. Next the tail end of the probe is inserted through splined fin holding sleeve 32 and pushed home until it seats with the O-rings, sealing the probe end to the plug 46. Thereafter the probe fin assembly 32 may be slipped into place over the probe nose and fins 36 thereof aligned and seated into their respective slots 34.

If desired a nose shield 68 may be provided as shown in FIG. 3. This is preferably of some light easily fractured material such as plastic and may be longitudinally scored on either the inner or the outer surface as shown at 70 (FIG. 4) in order to facilitate fracturing of the shield when the probe leaves the booster motor. To facilitate breakup of the shield it may also be provided with several contact blocks or pads 72 one for each sector and the inner surfaces of these blocks may normally closely approach the outer surface of the probe nose portion 12 as shown. It will be apparent that upon probe launch the probe nose will wedge the blocks and attached nose segments apart to clear them out of the way.

The meteorological probe booster assembly now is ready for launch. Upon ignition of the booster motor the assembly is accelerated upward until motor burn-out occurs at which time the probe separates from the booster motor by the drag differential between the two occasioned by greater drag forces acting on the booster. In conventional devices this separation occurs relatively slowly and, since the booster becomes unstable at burn-out and starts to wobble it can deflect the aft end of the probe during resulting in erratic flight of the probe, a lower apogee and possible loss of radar tracking contact with the probe.

In the present invention, however, motor burn-out is utilized to speed the separation process, impart further thrust to the probe and effect greater stability in the ejected probe. These results are achieved by making effective use of the tailing off pressure in solid propellant rocket motors, such tailing off from an internal pressure of 1000 p.s.i. to zero occurring during a booster burn out period of substantially ½ second. During this pressure decay the drag of the booster vehicle in flight is greater than the diminishing thrust of its motor resulting in initial probe movement out of canister 26. By operation of the valving means 46 the booster motor exhaust gas pressure is applied to the tail end of the probe expelling it at a greatly increased velocity so that it can reach greater altitudes and an accurate trajector can be obtained. In the present embodiment this is accomplished when, after substantially ½ inch movement of probe 10 out of canister 26 O-ring 56 clears the rear end of the probe so that pressure of the exhaust gases in the area bounded by surfaces 58 and 60 and the O-rings is sufficient to blow O-ring 56 out of its groove. When this occurs the exhaust gases exert pressure against the tail end of the probe forcing the probe from the canister. After O-ring 54 has cleared the probe rear end exhaust gases are admitted into the chamber formed by probe rear wall 40 to exert a positive ejection force against the exiting afterbody portion. It has been determined that 700 p.s.i. of exhaust gas is admitted into the canister aft of the probe in the present embodiment forcing the probe out of the canister in a manner similar to a projectile being expelled from a gun barrel. This 700 p.s.i. expels the probe at an additional velocity of substantially 200 ft./sec. As the probe travels out of the canister, the flared after portion 16 of the probe wedges into the inside of tapered sleeve 38 so that when the probe achieves free flight it has acquired a set of stabilizing fins.

Among the advantages realized through use of the present invention are greater stability in the probe booster vehicle because of the concealed probe fins and the very much shorter L/D ratio of the overall probe assembly, more accurate ejection of the probe occasioned by the considerably longer launch barrel formed by the canister, and the use of otherwise wasted tail-off gases to eject the probe at a considerably increased velocity. Separation of the probe from the booster vehicle is more precisely controlled due to the novel means of ejection utilizing relative movement between the probe and booster vehicle to initiate the release of tail-off gases, in effect using the probe as its own valve timing and separation initiation means. It will be apparent that if desired a small additional propulsion motor may be housed in the probe tail for ignition upon probe separation. This would provide even greater probe range. Though described as applied to a meteorological probe it will be apparent that the payload carrying second stage may also be called a projectile or a missile within the proper meaning of those terms.

It will be recognized that many modifications and variations of the present invention are possible in the light of the above teachings. It is therefore to be understood that within the scope of the appended claims the invention may be practiced otherwise than as specifically described.

I claim:
1. A combined meteorological probe and booster vehicle comprising:
   an instrumented probe having an afterbody portion disposed substantially fully within said booster vehicle;
   an expansion chamber formed in the aft end of said afterbody portion for receiving under selected conditions exhaust gases from the motor of said booster vehicle; and
   means in said booster vehicle for admitting exhaust gases into said expansion chamber at a selected point in the flight of the booster vehicle so as to assist in separating the probe and the vehicle.
2. The device of claim 1 wherein said expansion chamber is formed by sealing off the aft end portion of said probe by a closure member:
   said admitting means including valve means having an interior chamber communicating with the combustion chamber of the booster vehicle motor;
   said valve means having ports communicating between said interior chamber and a selected annular area in said afterbody portion; and
   removable sealing means sealing said annular area at least until tail-off of said exhaust gases occurs.

3. The device of claim 2 wherein said booster vehicle includes a solid propellant rocket motor having a centrally disposed combustion chamber;
   the propellant in said motor having a chamber in the forward end communicating with said combustion chamber;
   probe afterbody receiving means disposed in said forward chamber; and
   said valve means attached to said receiving means;
   so that exhaust gases when admitted into said expansion chamber will act to forcibly eject the probe from the receiving means and the booster vehicle.

4. In a meteorological probe and its booster vehicle the combination therewith of:
   means in the booster vehicle for receiving a substantial portion of the probe therein so as to substantially reduce the length of the combined probe and vehicle
   said means including means adapted to receive exhaust gases of the booster vehicle motor and divert these gases so as to provide an ejecting force against the probe at the time of separation thereof from the vehicle; and
   said gas receiving means actuable during burn-out of the booster vehicle motor.

5. The combination of claim 4 and further including probe stabilizing means carried by said booster vehicle:
   said stabilizing means becoming engaged by said probe as the probe is being separated from the booster vehicle.

6. The combination of claim 5 wherein said booster vehicle has a solid propellant rocket motor; and
   said probe receiving means being partially disposed within the solid propellant of the booster vehicle motor.

7. The combination of claim 5 wherein said probe stabilizing means includes a tapering sleeve having attached thereto a plurality of fins; and
   said probe including a nose portion for housing control equipment and an afterbody portion for housing a payload;
   the rear section of said afterbody portion tapered to mate with the taper of said sleeve;
   whereby an ejection of said afterbody passes through said sleeve and said sleeve becomes engaged by said rear section.

8. The combination of claim 6 wherein said probe stabilizing means includes a tapering sleeve having attached thereto a plurality of fins:
   the rear section of said probe tapered to mate with the taper of said sleeve;
   said sleeve removably mounted on the forward end of said vehicle.

9. The combination of claim 6 wherein said probe receiving means is an elongate canister open at both ends:
   said canister receiving in it a substantial portion of said probe;
   said canister being substantially fully received within said solid propellant and exposed to combustion gases therefrom;
   said canister coated where exposed to combustion gases by an ablative heat resistant material;
   said gas receiving means disposed in the end of said canister nearest the nozzle of said solid propellant rocket motor.

10. A projectile assembly comprising:
    a first stage having a longitudinal passage therein;
    a second stage housed substantially within said passage;
    an expansion chamber formed in the afterbody portion of the second stage for receiving under selected conditions exhaust gases from the motor of said first stage; and
    means in said first stage for admitting exhaust gases into said expansion chamber at first stage burnout so as to assist in separating the first and second stages;
    said means for admitting exhaust gases being responsive to the onset of relative separation between the second stage and the first stage due to the difference in velocity as the first stage is retarded by air drag.

11. In a rocket of the type made up of a booster section at least partially of tubular configuration and an elongated projectile of essentially cylindrical design, the latter being at least partially contained within said booster section during the initial phase of rocket flight and arranged to be separated by longitudinal displacement from said booster section upon the termination of such initial flight phase, said projectile member requiring means for stabilizing its flight following separation from said booster section, the improvement which comprises:
    a stabilizing fin assembly within and supported by said booster section so as to freely encircle the forward portion of said essentially cylindrical payload member during the initial phase of flight; and
    means effective upon a longitudinal displacement of said booster section and said payload member during separation to change the relative location of said stabilizing fin assembly from one in which it freely encircles the forward portion of said payload member to one in which it tightly engages the aft portion of such payload member.

12. An elongate projectile and propelling system therefor comprising:
    a housing having a forward portion and an after portion and an elongate projectile body receiving bore extending therebetween;
    a projectile in said bore with its nose portion at the forward end and its tail portion at the after end said tail portion being formed for quick attachment to a stabilizing fin assembly;
    a stabilizing fin assembly including a plurality of radially extending fins and a fin support structure said fin support structure being formed for quick engagement with said projectile tail portion;
    said stabilizing fin assembly at launch being located in the forward portion of the housing and adjacent the path followed by the projectile upon launch whereby upon launch the tail portion of the projectile will engage the stabilizing fin assembly so that the fin assembly is carried with and stabilizes the projectile during flight.

13. The device of claim 12 wherein the projectile tail portion is peripherally enlarged and the fin support structure comprises a sleeve having an internal diameter larger than the major portion of the projectile but less than the peripheral enlargement.

References Cited
UNITED STATES PATENTS

| | | | |
|---|---|---|---|
| 2,344,957 | 3/1944 | Anzalone | 244—3.26 |
| 3,070,018 | 12/1962 | Fahl | 102—49.5 |
| 3,145,657 | 8/1964 | Shrout et al. | |
| 3,160,098 | 12/1964 | Schulze et al. | 102—49.5 |
| 3,167,016 | 1/1965 | Czerwinski et al. | 102—49.4 X |
| 3,260,204 | 6/1966 | Wilkey | 102—49.5 X |

FOREIGN PATENTS 1,147,642  6/1957  France.

BENJAMIN A. BORCHELT, *Primary Examiner.*
VERLIN R. PENDEGRASS, *Examiner.*